United States Patent
Jeong

(10) Patent No.: US 6,351,598 B1
(45) Date of Patent: Feb. 26, 2002

(54) APPARATUS AND METHOD FOR SEARCHING PHOTO INFORMATION IN DIGITAL CASSETTE RECORDER (DVCR)

(75) Inventor: Yong-ju Jeong, Suwon (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 13 days.

(21) Appl. No.: 09/583,581

(22) Filed: May 31, 2000

Related U.S. Application Data

(62) Division of application No. 08/978,415, filed on Nov. 25, 1997, now Pat. No. 6,181,868.

(30) Foreign Application Priority Data

Feb. 17, 1997 (KR) .............................................. 97-4761

(51) Int. Cl.$^7$ ................................................. H04N 5/91
(52) U.S. Cl. ............................ 386/69; 386/117; 386/68
(58) Field of Search ............................... 386/68, 69, 73, 386/76, 80, 107, 117, 81, 38, 6, 2, 1, 46, 55, 52, 120, 121; H04N 5/765, 5/77, 5/783

(56) References Cited

U.S. PATENT DOCUMENTS

| | | | |
|---|---|---|---|
| 5,126,851 A | | 6/1992 | Yoshimura et al. ............ 386/52 |
| 5,377,051 A | * | 12/1994 | Lane et al. .................... 386/68 |
| 5,568,275 A | | 10/1996 | Norton et al. ................. 386/52 |

FOREIGN PATENT DOCUMENTS

| | | | |
|---|---|---|---|
| DE | 44 34 034 | 3/1996 | ......... G11B/15/087 |
| EP | 0 291 934 | 11/1988 | ........... G11B/27/32 |
| JP | 57-143773 | 9/1982 | ........... G11B/27/28 |
| JP | 58-53042 | 3/1983 | ........... G11B/15/02 |
| JP | 63-213143 | 9/1988 | ........... G11B/15/02 |
| JP | 2-24859 | 1/1990 | ......... G11B/15/087 |
| JP | 7-98965 | 4/1995 | ........... G11B/27/28 |

* cited by examiner

Primary Examiner—Robert Chevalier
(74) Attorney, Agent, or Firm—Sughrue Mion, PLLC

(57) ABSTRACT

A continuous search method is provided searching among discontinuously recorded sheets of photo information, which are recorded in a digital recording medium. The method calls for using a typical fast-speed FF or REW operation to detect an end point of a recorded block corresponding to a sheet of photo information. Then a slow-speed REW function is used to perform reproduction so as to detect the corresponding start point of the recorded sheet of photo information. Once the starting and ending points of a recorded block of a sheet of photo information are detected, the sheet of photo information is reproduced (using a playback operation) and displayed from the detected start point to the detected end point. Immediately upon completion of the reproduction of the entire sheet of information (i.e., when the end point of the block is reached) the end point of a subsequent recorded block of a sheet of photo information is searched for using the fast-speed FF or REW operation, thus beginning a repetition of the method. As a result, a plurality of sheets of the discontinuously-recorded photo information are continuously searched by repeating the method.

6 Claims, 3 Drawing Sheets

APPARATUS AND METHOD FOR SEARCHING PHOTO INFORMATION IN DIGITAL CASSETTE RECORDER (DVCR)

This is a divisional of application Ser. No. 08/978,415 filed Nov. 25, 1997 now U.S. Pat. No. 6,181,868, the disclosure of which is incorporated herein by reference.

BACKGROUND OF THE INVENTION

1. Field of the Invention

The present invention relates to an apparatus and method for searching photo information in a digital video cassette recorder (DVCR), and more particularly, to a photo information searching in which a plurality of discontinuously-recorded sheets of photo information are continuously displayed.

2. Description of Related Art

A digital camcorder, which includes a photographing unit in addition to the functions of a DVCR, can record a digital moving picture compression signal on a VHS tape and reproduce the thusly recorded signal. Using such a camcorder/DVCR, 12 gigabytes of digital signals, which are equivalent to up to 150 minutes of displayed video, can be recorded on a tape. Additionally, since the digital camcorder uses digital compression and restoration techniques, noise is kept to a minimum, the image quality does not deteriorate even during recursive reproduction, and compact disk quality sound can be realized. Importantly, the use of digital compression and restoration enables the storage and editing of about 500 sheets of photo information on a 60-minute tape.

The sheets of photo information are sequentially recorded on a predetermined number of frames when the photographing unit of the digital camcorder photographs an identical object. In the prior art, a user must manually search desired photo information from a recording medium on which a number of sheets of photo information are discontinuously recorded.

SUMMARY OF THE INVENTION

To solve the above problem, it is an object of the present invention to provide an apparatus and a method to search for a desired sheet of photo information within a short time by continuously displaying discontinuously-recorded photo information.

To accomplish the above object, there is provided a method and apparatus for searching photo information, particularly, discontinuous photo information recorded on a recording medium. The method is implemented in a digital video cassette recorder performing reproduction at a variable speeds. The method includes the steps of:

(a) detecting the end point of a sheet (or piece) of the discontinuously-recorded photo information by performing reproduction at a first variable speed when a search command is input;

(b) detecting the start point of the photo information sheet corresponding to the end point detected in step (a) by performing reproduction at a second variable speed;

(c) reproducing and displaying photo information between the detected start and end points of the photo information; and (d) continuously searching a plurality of sheets (or pieces) of the discontinuously-recorded photo information by repeatedly performing the steps (a) through (c).

The steps of detecting the start and end points of the photo information are performed using photo recording information recorded in a subcode area of the recording medium.

The reproduction at the second variable speed is slower than the rewind (REW) reproduction at the first variable speed. Preferably, the first variable speed corresponds to the speed of ordinary rewind or fast forward.

BRIEF DESCRIPTION OF THE DRAWINGS

The above object and advantage of the present invention will become more apparent by describing in detail a preferred embodiment thereof with reference to the attached drawings in which.

DETAILED DESCRIPTION OF THE INVENTION

Figure 1:
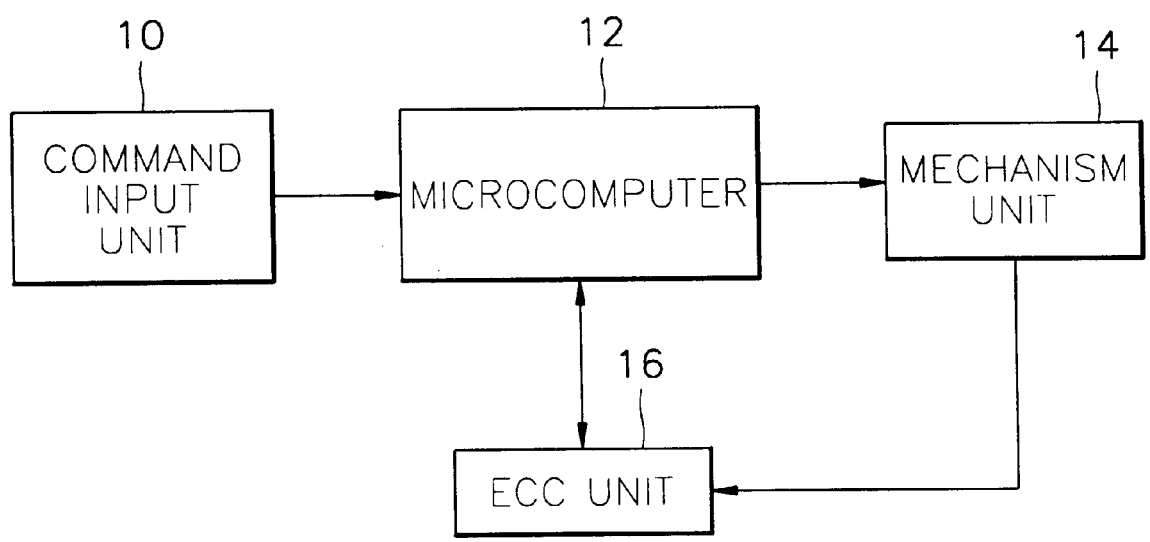
FIG. 1 is a block diagram showing the configuration of a digital image reproducing apparatus according to the present invention for continuously searching discontinuous photo information.

Referring to FIG. 1, a digital image reproducing apparatus according to the present invention includes a command input unit 10 for applying an execution command, and a microcomputer 12 which receives a predetermined subcode and outputs a control signal corresponding to the received subcode according to the execution command output from command input unit 10. A mechanism unit 14 controls the speeds of a capstan motor, a drum motor, etc., based upon the control signal output by the microcomputer 12, and performs reproduction at variable speeds, including a first variable speed, a second variable speed, and regular playback speed. An Error Correction Code (ECC) unit 16 detects and corrects the errors of a digital signal reproduced by means of the mechanism unit 14, and outputs the subcode portion of the reproduced data from an internally-installed memory.

According to the present invention, the first variable speed denotes the typical fast forward (FF) or rewind (REW) reproduction, and the second variable speed denotes a REW reproduction which is slower than the first variable speed. Optionally, the second variable speed may be the same speed as typical playback speed, or may be intermediate to typical rewind speed and typical playback speed.

The operation of the apparatus shown in FIG. 1 will now be described as follows.

When a search execution command (hereinafter, called a photo search command) of a low-speed REW mode (i.e., at the second variable speed), as discriminated from a typical FF/REW mode (i.e., at the first variable speed), is input through the command input unit 10, the microcomputer 12 receives the photo search command and switches on a photo search mode in order to search discontinuous photo information. In the photo search mode, the microcomputer 12 controls the mechanism unit 14 to perform an FF/REW operation at the first variable speed until the end point of a piece of photo information recorded on a tape is detected. When the end point of the photo information is detected, the mechanism unit 14 is controlled so that a low-speed (second variable speed) REW reproduction is performed up to the start point of the photo information piece corresponding to the end point, at which point a normal playback reproduction for displaying searched photo information is performed from the start point to the end point. The microcomputer 12 determines the start and end points of the photo information by reading the contents of the digital subcode which has been reproduced and stored in a memory of the ECC unit 16, for use in a digital control method.

The low-speed (second variable speed) REW reproduction, which is slower than the first variable speed, is performed when the end point of the photo information is detected, to search the exact start point by searching the photo information piece from the end point back to the start point.

To perform a continuous photo search, after a piece (or sheet) of photo information-is displayed by playback reproduction through the end point, a typical FF or REW reproduction at the first variable speed is then performed until the end point of the next photo information piece is found. That is, when the photo search is performed in a FF mode, the FF operation is performed immediately after the completion of each search/display of a photo sheet, to provide for continuous search. When the photo search is performed in a REW mode, the REW operation is performed immediately upon the completion of each photo sheet search/display.

The low-speed operation according to the photo search As modes (either FF mode or REW mode) controls a drum motor and a capstan motor of the mechanism unit 14 according to a phase control that is different from the typical FF/REW operation. The phase control is performed according to a method such as a typical analog FM correction. With regard to digital error correction, the ECC correction is for accurately reading a subcode rather than for the sake of the correction itself.

Figure 2:
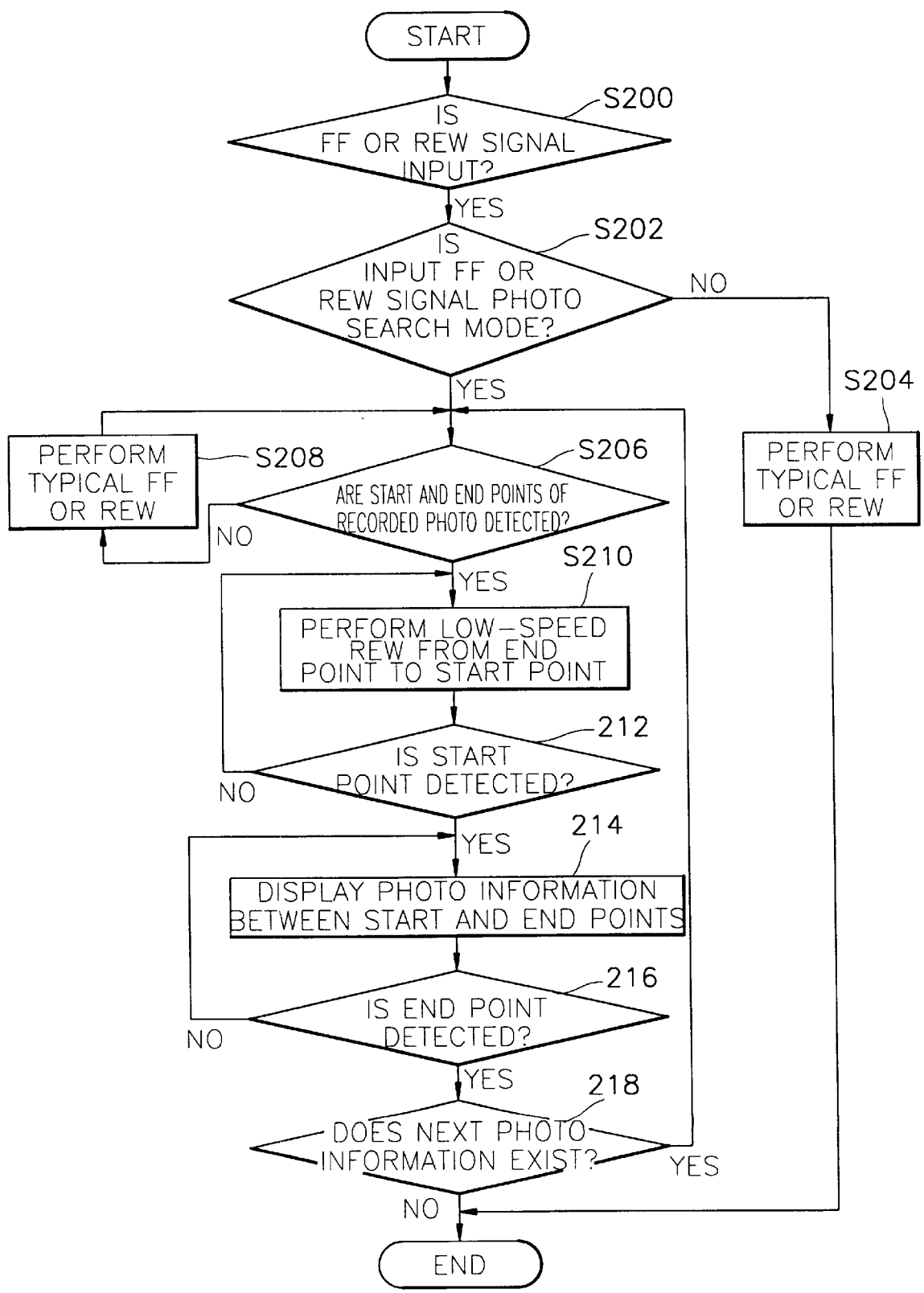
FIG. 2 is a flow chart outlining a continuous search method, according to the present invention, for discontinuous photo information recorded in a digital recording medium.

FIG. 2 is a flow chart describing a method for continuously searching discontinuous photo information recorded in a digital recording medium according to the present invention.

Figure 3:
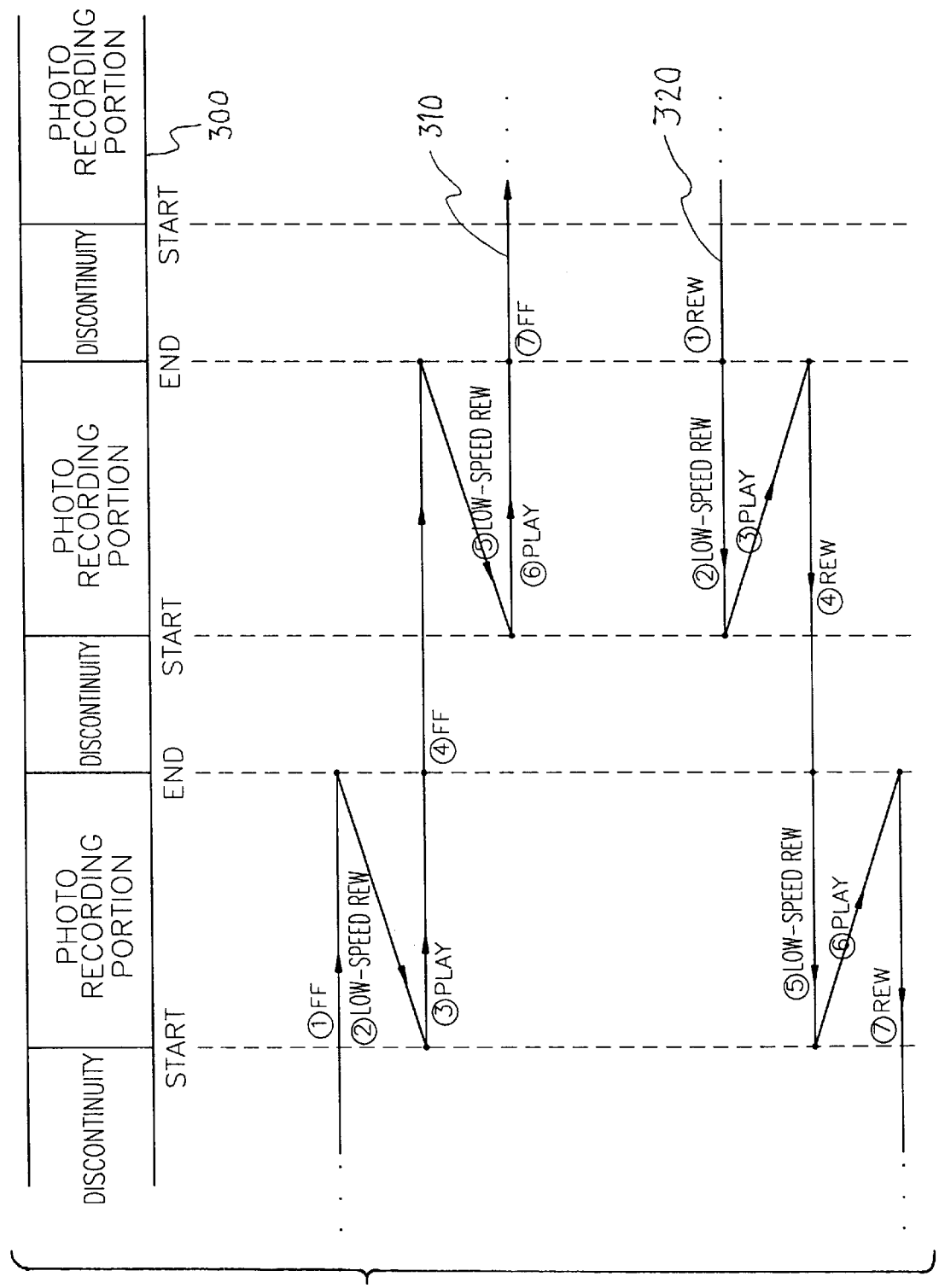
FIG. 3 is a set of diagrams showing an example of a pattern of discontinuous photo information recorded on a digital recording medium, and alternative paths (FF and REW modes) for continuously searching the discontinuous photo information according to the present invention.

FIG. 3 shows a set of diagrams which illustrate paths for continuously searching discontinuous photo information according to the present invention. Schematic representation 300 shows a schematic of a digital recording medium where discontinuous photo information is recorded. Path 310 shows a path for continuously searching the discontinuously recorded digital photo information pieces in the FF photo search mode. Path 320 shows a path for continuously searching the discontinuously recorded digital photo information in the REW photo search mode.

Now, the photo search method shown in FIG. 2 will be described with reference to FIG. 3.

In step 200, a determination of whether a predetermined FF/REW execution command signal is input is made. Then, a determination of whether or not the input FF/REW execution command signal is a photo search mode is made in step 202.

If the input FF/REW execution command signal is not the photo search mode, the typical FF or REW operation of the first variable speed is performed in step 204. Otherwise, a determination of whether the end point of the photo information was detected during the typical FF or REW operation is made in step 206. If the end point of the recorded photo information is not detected, the typical FF or REW operation continues (step 208) until the end point of the recorded photo information is detected.

When it is determined in step 206 that the end point of the recorded photo information is detected, the low-speed (second variable speed) REW operation is performed (step 210) up to the start point of the photo information corresponding to the end point.

That is, in order to detect the start point of the recorded photo information in the FF photo search mode shown by path 310, the low-speed REW operation is performed, upon detection of the end point during the typical (high-speed) FF operation, from the end point to the start point.

On the other hand, in the case of the REW photo search mode shown by path 320, the start point is detected by performing the low-speed REW operation, upon detection of the end point during the typical (high-speed) REW operation, from the end point to the start point.

When the start point is detected in step 212, the photo information is displayed, in step 214, by means of typical playback reproduction. When the end point is detected in step 216, a determination of whether or not a subsequent photo information portion exists is made in step 218. If the next photo information portion exists, another photo search operation is performed in the same way starting from the step 206.

As described above, in a method for searching photo information in a digital image reproduction apparatus according to the present invention, several frames of photo information are continuously searched and displayed automatically in a short time from a recording medium in which hundreds of frames of photo information are discontinuously recorded.

Although the present invention has been described above in terms of a preferred embodiment, it will be appreciated that various modifications may be made to the described embodiment without departing from the spirit and scope of the invention.

What is claimed is:

1. A digital image reproducing apparatus capable of searching a plurality of photo information portions discontinuously recorded on a recording medium, each of the photo information portions having a respective start point and a respective end point, said apparatus comprising:

a command input unit for outputting an execution command;

a microcomputer for receiving said execution command, wherein said microcomputer outputs a control signal corresponding the received execution command;

a mechanism unit receiving said control signal from said microcomputer, said mechanism unit for reproducing digital images from said recording medium at a reproduction speed corresponding to the control signal received from said microcomputer, wherein said reproduction speed is selected from one of a first variable speed, a second variable speed, and a normal playback speed; and an error correction code unit for detecting and correcting errors of a digital signal reproduced by said mechanism unit, said error correction code unit also storing and outputting a subcode portion said digital signal reproduced to said microcomputer.

2. The digital image producing apparatus according to claim 1, wherein said first variable speed is one of a fast forward reproduction speed and a rewind reproduction speed, and wherein said second variable speed is a rewind reproduction speed that is slower than said first variable speed.

3. The digital image reproducing apparatus of claim 1, wherein said microcomputer is responsive to information regarding the start point and end point of a photo information portion in generating said control signal.

4. The digital image reproducing apparatus of claim 1, wherein said mechanism unit is responsive to the control signal from the microcomputer to selectively switch among said first variable speed, said second variable speed and the normal playback speed in response to the detection of at least one of the start point and end point.

5. The digital image reproducing apparatus of claim 1, wherein said microcomputer is operative to determine at least one of end points and start points in response to the sub-code portion reproduced by the error correction code unit.

6. The digital image reproducing apparatus of claim 1, wherein the microcomputer is operative to control display of an image on the basis of the photo information portions recorded on a recording medium in response to detection of at least one of the end point and start point for said image.

* * * * *